United States Patent

Geis

[15] 3,640,118
[45] Feb. 8, 1972

[54] FRICTION-TESTING APPARATUS AND METHODS

[72] Inventor: David G. Geis, Chicago, Ill.
[73] Assignee: Teletype Corporation, Skokie, Ill.
[22] Filed: Mar. 9, 1970
[21] Appl. No.: 17,664

[52] U.S. Cl. .................................................. 73/9
[51] Int. Cl. .................................................. G01n 19/02
[58] Field of Search ............... 73/9, 150 A, 7, 9; 235/151.3; 192/75, 111 B

[56] References Cited

UNITED STATES PATENTS

| | | | |
|---|---|---|---|
| 2,441,993 | 5/1948 | Dasher | 73/9 X |
| 2,887,875 | 5/1959 | Curriston | 73/9 |

FOREIGN PATENTS OR APPLICATIONS

| | | | |
|---|---|---|---|
| 800,953 | 9/1958 | Great Britain | 73/9 |

Primary Examiner—Louis R. Prince
Assistant Examiner—Daniel M. Yasich
Attorney—J. L. Landis and R. P. Miller

OTHER PUBLICATIONS

Publ. "Frictional Phenomena", by A. Gemant, Journ. of Applied Physics., pp. 510-517, Vol. 14, Oct., 1943. 73/9 (See pg. 513-515)

Publ. "An El. Computer for the Evaluation of Strain-Rosette Data" by Hoskins et al. Exp. Stress Analysis. Vol. II. No. 1, 1944, pp. 67-69, 73/88.5.

[57] ABSTRACT

A more accurate determination of the coefficient of friction between a clutch shoe and drum of a metallic friction clutch is attained from an output measured force which bears a nonlinear relationship to the coefficient of friction. The output force is obtained by (1) applying an input predetermined force on one side of the clutch shoe, which has a pair of bearing surfaces engaging the drum, (2) applying an aiding torque to the drum, and (3) measuring the force transmitted to the opposite side of the clutch shoe. Alternatively, a friction-measuring device of general application utilizes a fixture for holding a pair of samples of a first material in engagement with an arcuate surface of a second material to which a predetermined input force and torque are applied while the fixture is restrained from movement to produce an output reactive force on the holder from which the coefficient of friction between the two materials may be computed by the solution of three simultaneous equilibrium equations of the forces on the materials.

7 Claims, 7 Drawing Figures

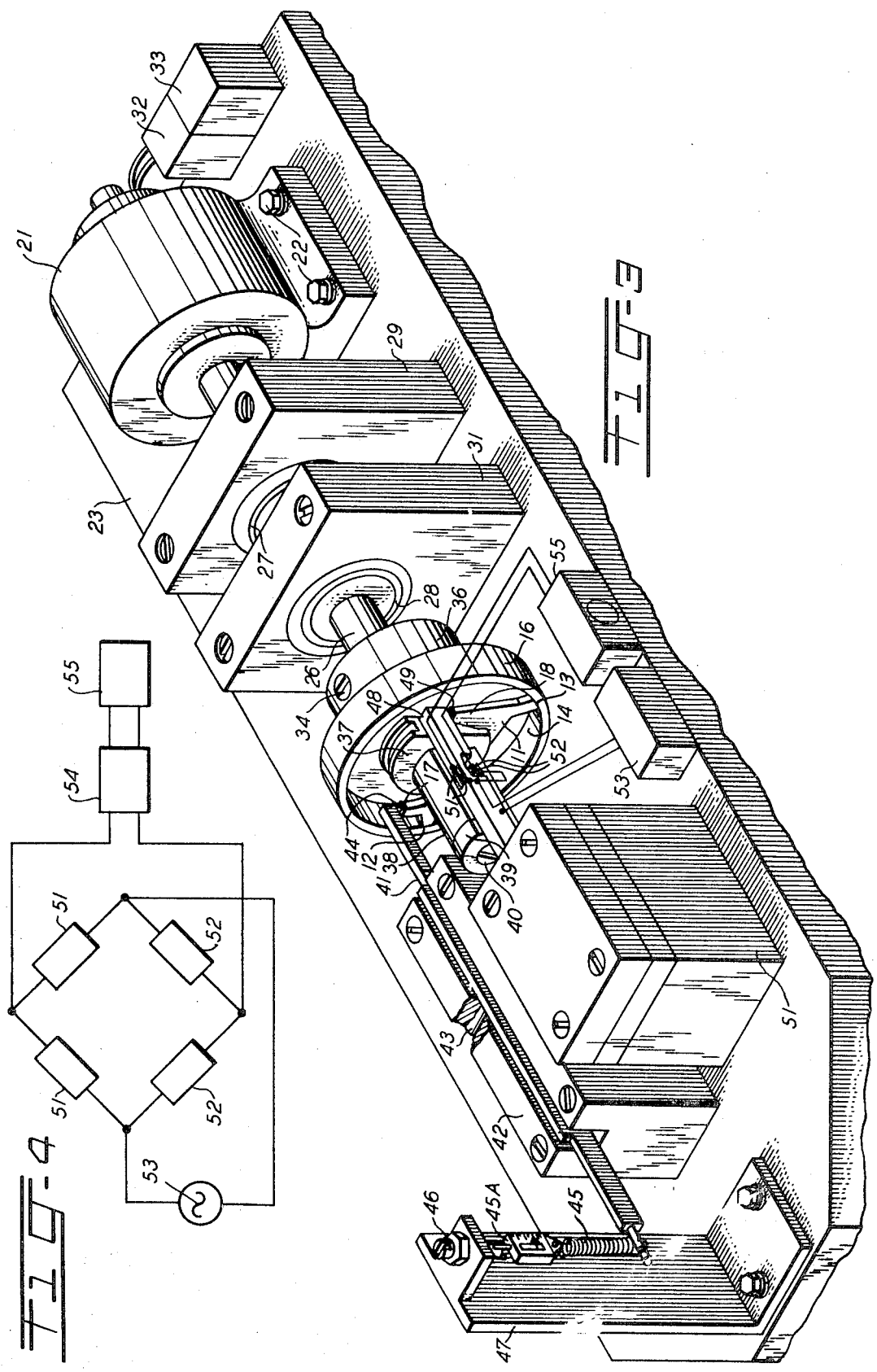

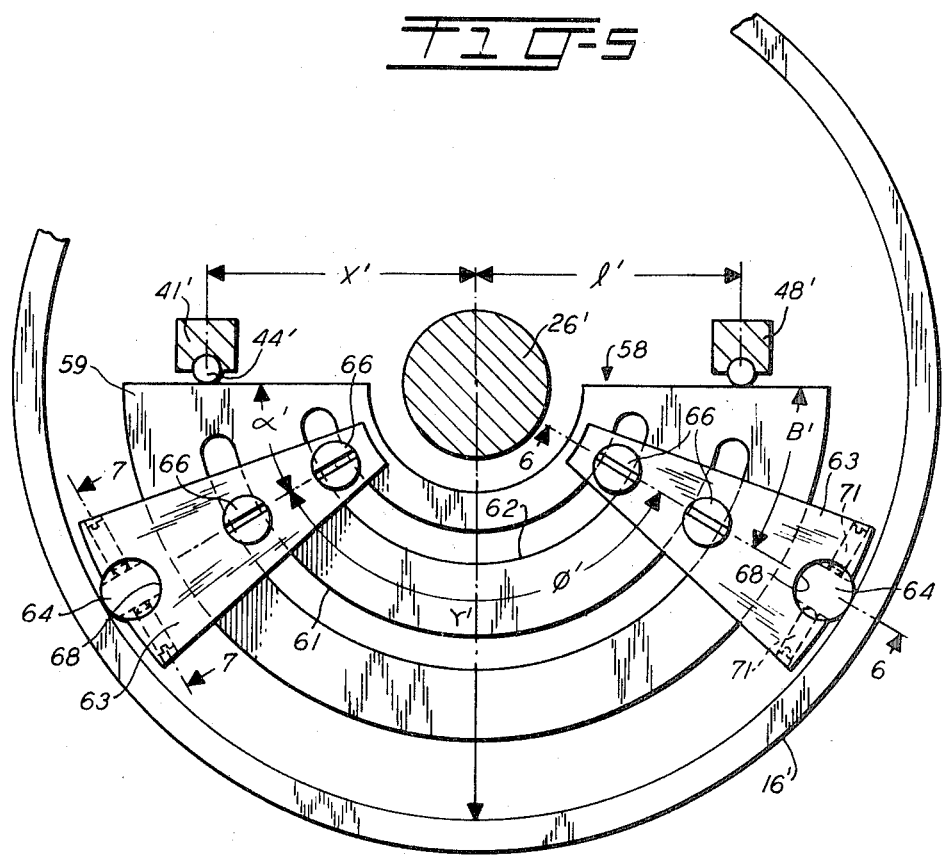
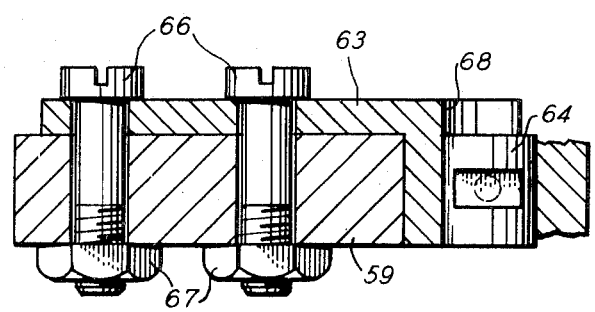
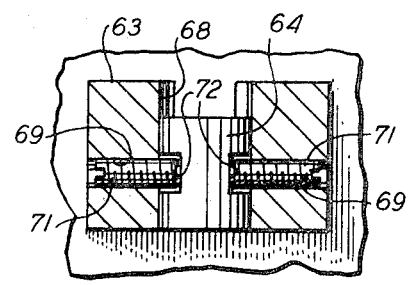

FRICTION-TESTING APPARATUS AND METHODS

BACKGROUND OF THE INVENTION

The invention relates to methods and apparatus for ascertaining coefficients of friction and more particularly to methods and apparatus for determining coefficients of friction between a first member having pair of engaging surfaces and a second member having a curved surface engaged by the surfaces of the first member.

In telegraph apparatus, metallic friction clutches are used extensively for high speed motion transfer. An example of one such metallic friction clutch is disclosed in U.S. Pat. No. 2,568,249, to A. N. Nilson et al. The clutch shoe is divided into two parts each of which has multiple friction-engaging surfaces which cooperate with a driving drum. The problem of slippage between the clutch shoe and drum is discussed in U.S. Pat. No. 2,678,118 to W. J. Zenner. The latter patent discloses that slippage is minimized by forming transverse grooves in the contact surfaces of the clutch shoe and the drum.

One of the prime considerations in minimizing slippage between the clutch shoe parts and the driving drum of a clutch of the above type is the selection of the materials from which the clutch parts are formed. In this connection the coefficient of contact friction, $\mu$, between parts is of foremost concern.

In the past, the coefficient of friction between a clutch shoe part and a driving drum was measured without regard to the arrangement of the parts, as they were actually used, i.e., the coefficient of friction was determined apart from the functioning mechanism. The coefficient of friction was determined by measuring the force normally urging samples of two materials together, determining the applied or reactive force imparted to one of the samples tending to move it relative to the other sample and then computing the coefficient of friction by dividing the applied or reactive force by the normal force.

It must be recognized that generally the most advantageous measurement of the coefficient of friction between the parts of any mechanism is one performed on the mechanism itself. In accordance with the present invention, it has been discovered that the geometry and mode of cooperation of the parts of a metallic friction clutch of the type described are important parameters to be considered in determining the actual coefficient of friction in a functioning clutch mechanism. Further, it has been discovered that in an attempting to evolve a method of determining the coefficient of friction between a clutch shoe part and drum of the type described a measurable reactive force is generated which varies nonlinearly with the coefficient of friction between the parts. The measurement of this force makes possible the computation of a coefficient of friction far more accurate than any which could be determined from conventional methods. This latter discovery makes possible a more accurate friction-measuring method and apparatus of general application able to replace conventional sample-type friction-testing methods.

SUMMARY OF THE INVENTION

An object of the present invention is to provide a new and improved method and apparatus for determining coefficients of friction between a first member having a pair of engaging surfaces add a second member having an arcuate driving surface.

A further object of the present invention is to provide a new and improved method and apparatus for determining coefficients of friction between the parts of a metallic friction clutch when such parts are functionally arranged as in a working clutch and the geometrical arrangement of the parts is taken into consideration.

Another object of the present invention is to provide a new and improved apparatus for measuring the coefficient of friction between a pair of first members and a second member having an arcuate surface wherein measurable forces, such as input ad output forces, are used to set up simultaneous equilibrium equations which are solved to provide more accurate values of the coefficient of friction between the two members under various applied forces.

With these objects in view, the present invention contemplates, in a first embodiment, a friction-measuring apparatus and method for accurately determining the coefficient of friction between a pair of spaced members engaging the arcuate surface of a second member under a number of different force application situations. In one application of the invention, a pair of spaced engaging elements of a clutch shoe and a clutch drum are forced together, with a known applied force, while the clutch drum is subjected to a torque, and then the output force impressed on the clutch shoe is measured. With the geometry of the clutch parts being known, and the input and output force being measured, data is provided to solve three simultaneous equilibrium equations to provide true values of the actual coefficient of friction during various applied forces.

The invention also contemplates a universal fixture which allows for the determination of the coefficient of friction between various materials under various forces where one of the materials is shaped to provide a driving member having an arcuate surface and the other material is formed to provide a pair of spaced, engaging driven members.

With the use of the method and apparatus of the invention accurate determinations of the coefficient of friction are made, and these determinations reveal that the coefficient of friction varies in a nonlinear fashion with respect to a measured output force impressed on the driven member.

DESCRIPTION OF THE DRAWINGS

A more comprehensive understanding of the invention may be obtained from the following detailed description when read in conjunction with the following drawings wherein:

FIG. 3 is a perspective view of the friction-testing apparatus of the present invention particularly illustrating the location of an input force applicator and an output force detector for measuring the force Q;

FIG. 4 is an electrical schematic of a Wheatstone bridge arrangement of electrical resistance gages together with an output recording device for detecting and measuring the force Q;

FIG. 5 is a front elevational view of one embodiment of a universal test sampler holder for a friction-measuring device of general application showing the relative positions of the input force applicator and the output force detector of FIG. 3;

FIG. 6 is a sectional view taken along line 6—6 of FIG. 5 showing a support member and a test sample holding leg for the holder shown in FIG. 5; and FIG. 7 is a sectional view taken along the line 7—7 of FIG. 5 showing a test sample retained in one leg of the holder of FIG. 5.

DETAILED DESCRIPTION

Figure 1:
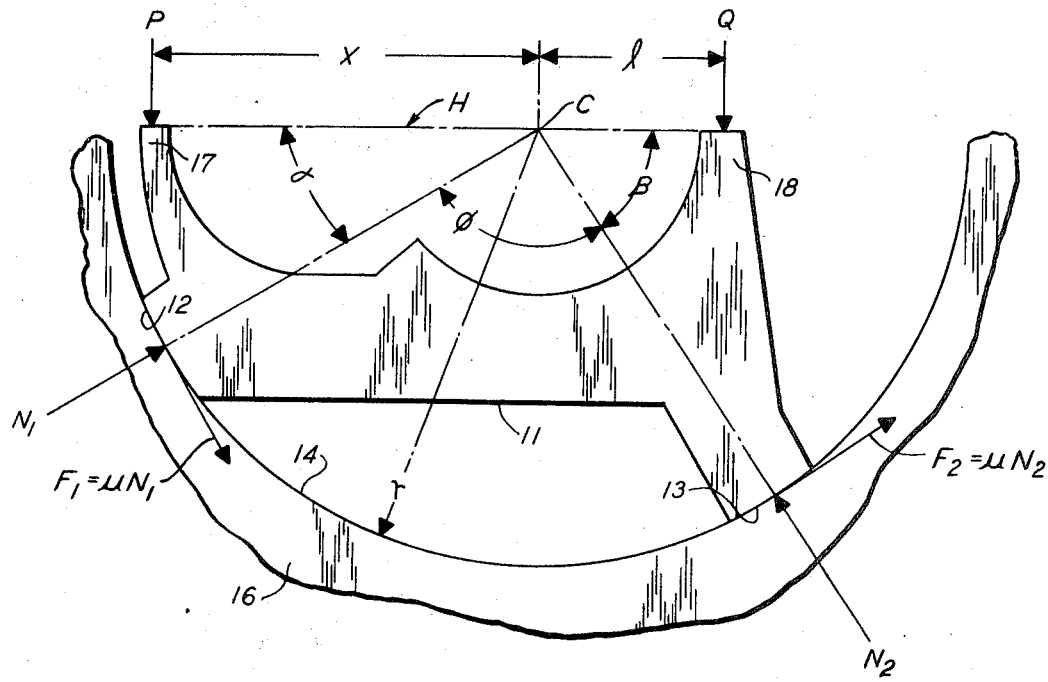
FIG. 1 represents a free body diagram illustrating a method of measuring the coefficient of friction between two materials according to the present invention and in particular to the method as applied to the clutch shoe and drum of a metallic friction clutch.

In order to illustrate the principles of the invention, there is shown in FIG. 1 a free body diagram of two elements of a metallic friction clutch. More particularly a driven clutch shoe 11, of the type disclosed in the aforementioned patents, is provided with a first bearing surface 12 and a spaced, second bearing surface 13 in engagement with a curved surface 14, which represents the inside periphery of a driving clutch drum 16.

In practicing the method of the invention, it has been found that the geometry of the engaging elements represents an important factor. Point C of FIG. 1 represents the center of curvature of the drum 16 which has an inside radius of curvature $r$. The bearing surfaces 12 and 13 are angularly located from a horizontal line H through point C, which represents a diameter of drum 16. The centerline of bearing surface 12 is located at an angle $\alpha$, measured counterclockwise from line H and the centerline of bearing surface 13 is located at an angle $\beta$, measured clockwise from line H. The angle $\phi$ between bearing surfaces 12 and 13 is thus $180°-(\alpha+\beta)$. The apex of angle $\phi$ coincides with point C.

The shoe 11 is formed at its uppermost portion into a pair of arms 17 and 18 which lie at opposite distances X and $l$ respectively, from point C along line H.

In determining the coefficient of friction between shoe 11 and drum 16 in accordance with the principles of the invention, consideration must be given to the effect of all forces applied in the particular geometrical arrangement. If a known force P is applied to the top or terminal surface of arm 17 on shoe 11, the shoe 11 will be urged into engagement with the inner periphery 14 of the drum 16. Further, there will exist a tendency for the shoe 11 to rotate in a counterclockwise direction about the point C. Due to the frictional contact between the bearing surfaces 12 and 13 of the shoe 11 with the surface 14 of drum 16 there will be frictional forces tending also to rotate the drum 16 counterclockwise about point C. Now, if a torque is applied to aid in rotating the drum 16 in the counterclockwise direction, the frictional forces developed will tend even more to rotate shoe 11 counterclockwise about point C.

In accordance with the principles of the invention, a restraining force Q is applied to hold the shoe 11 from movement so that an equilibrium situation is established. With the system thus in equilibrium and knowing the input and output forces, three simultaneous equilibrium equations may be defined and solved to provide an accurate determination of the actual coefficient of friction between the shoe 11 and the drum 16.

Considering now an analysis of the forces acting on the parts of the clutch shown in FIG. 1, it will be seen that at each point of contact between the shoe 11 and the drum 16, there appear normal contact forces represented by forces $N_1$ and $N_2$ acting on bearing surfaces 12 and 13, respectively. The resistance to sliding between the surfaces 12 and 13 of shoe 11 and the surface 14 of drum 16 appears as frictional forces $F_1$ and $F_2$ respectively. At impending slip or sliding, the magnitudes of $F_1$ and $F_2$ are $\mu N_1$ and $\mu N_2$, respectively, from well-known relationships, where $\mu$ is the coefficient of friction between the shoe 11 and the drum 16.

With the system of FIG. 1 in static (impending motion of drum 16) or dynamic (motion of drum 16 at constant velocity) equilibrium, the values of the static and kinetic coefficients of friction between the shoe 1 and drum 16 each may be calculated by solving three simultaneous equilibrium equations. Three equations are required since the system contains three unknowns: $N_1$, $N_2$, and $\mu$.

In order to facilitate the solution of these equations, the force P is applied in a direction normal to the top surface of arm 17 on shoe 11 and the force Q is measured normal to the top surface of arm 18. Thus, given that the applied and output forces exist solely in a common plane in the vertical direction, a summation of the horizontal force components of the system yields a first equilibrium equation.

$$N_1(\cos \alpha + \mu \sin \alpha) - N_2(\cos \beta - \mu \sin \beta) = 0 \quad (1)$$

A summation of the force components in the vertical direction yields a second equilibrium equation:

$$N_1(\sin \alpha - \mu \cos \alpha) + N_2(\sin \beta + \mu \cos \beta) - P - Q = 0 \quad (2)$$

The third and final equilibrium equation may be obtained by a summation of the moments taken counterclockwise about a convenient point such as the center of curvature C, which yields:

$$\mu N_1 r + \mu N_2 r - Ql + Px = 0 \quad (3)$$

simultaneous solution of equations (1) through (3) will give the values of the three unknowns $N_1$, $N_2$, and $\mu$. Thus, the solution to equations (1), (2), and (3) will give the coefficient of friction $\mu$ between the clutch shoe 11 and drum 16 and therefore the frictional forces $F_1$ and $F_2$ at the bearing surfaces 12 and 13, respectively.

Because of the length of equations (1), (2), and (3), the most convenient way of solving them for $\mu$, $N_1$, and $N_2$ is with the aid of a computer, such as a General Electric Mark I computer. This is especially true if many tests on different clutches are to be made and information is to be set forth in a graphic illustration, or in a catalogue.

Figure 2:
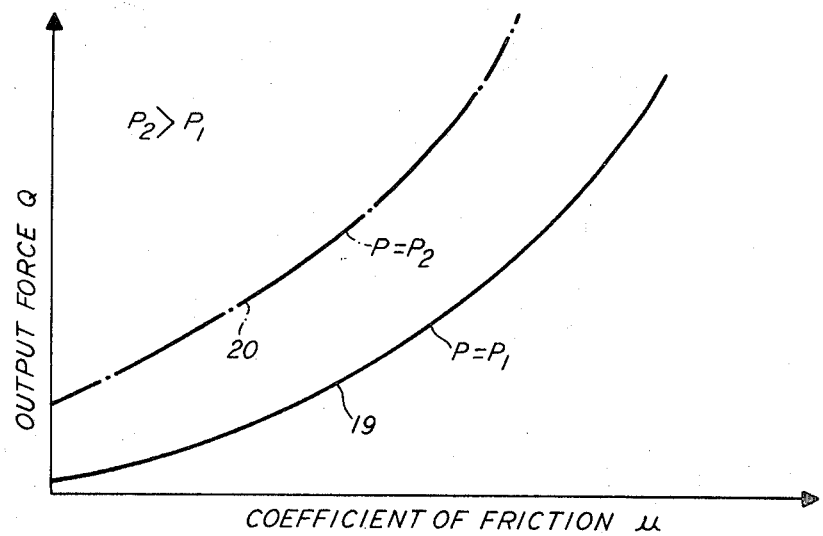
FIG. 2 is a graph illustrating tee nonlinear relationship between an output force Q and the coefficient of friction $\mu$ between the two materials under test.

Referring to FIG. 2 and more particularly to the characteristic curve 19 thereof and with a constant known applied force P, the output measured forces and the corresponding coefficients of friction have been obtained upon application of a number of different applied torques so that the curve in FIG. 2 may be plotted. It will be observed that the calculated coefficient of friction $\mu$, varies in a nonlinear relation with incremental, uniform increases in the measured output force Q. The nonlinear relationship illustrates the sensitivity of the method of FIG. 1 over other conventional methods of measuring $\mu$ since it can be seen that Q changes more rapidly for a small change in $\mu$ than would another force which bears a linear relationship to $\mu$. The nonlinearity of the curve of FIG. 2 further illustrates that force amplification is obtained where more than one contact is made between the surfaces under test. The curve 20 of FIG. 2, shown in phantom lines illustrates the displacement of curve 19 when input force P is increased.

Turning attention now to FIG. 3, there is shown an apparatus for carrying out the method of the invention described in conjunction with FIGS. 1 and 2. A variable speed electric motor 21 is secured by suitable fasteners 22—22 to a base plate 23. The motor 21 is connected to a rotatable shaft 26 journaled in a bearing 27 and a bearing 28 housed in bearing blocks 29 and 31, respectively.

The torque applied to shaft 26 by motor 21 may be varied by a suitable motor control 32, connected between the motor 21 and an energy source 33. The drum 16 of FIG. 1 is fastened to the shaft 26 by a setscrew 34 through a hub 36 on the drum 16. The clutch shoe 11 is supported within the drum 16, with its bearing surfaces 12 and 13 in engagement with the inside periphery 14 of the drum 16.

The shoe 11 is supported within the drum 16 by fitting the upper portion of shoe 11, lying between arms 17 and 18, within a circumferential slot formed in a truncated flange 37 projecting from a sleeve 38 mounted on the leftmost section of shaft 26. The sleeve 38 is prevented from movement longitudinally with respect to shaft 26 by the drum 16 on one side and a collar 39 secured to the end of the shaft 26 by a screw 40.

An input loading lever 41 is pivotally supported within a support frame 42 on base plate 23 by pivot pin 43. The lever 41 applies the predetermined force P to the arm 17 of the clutch shoe 11 through a bar 44 retained within a bore formed in the underside of the lever in the end of the lever 41 to urge the bearing surfaces 12 and 13 thereon further into engagement with the surface 14 of drum 16. The force P applied by lever 41 may be varied by adjusting the tension of spring 45 (which may include a calibrated scale 45A) secured to the end of lever 41 and an adjusting screw 46 on a bracket 47 secured to base plate 23 merely by turning adjusting screw 46.

An output force measuring cantilever beam 48 is positioned to contact output arm 18 of shoe 11 through a ball 49 retained in a bore formed in the underside of beam 48. The cantilever beam 48 is supported at its fixed end in a beam support frame 51 secured to base plate 23. In order to accurately measure the restraining force Q, the beam 48 has two sets of active electrical resistance, strain gage elements 51—51 and 52—52 cemented to the top and bottom, respectively, thereof. The elements 51—51 are subjected to compression while the elements 52—52 are subjected to tension whenever the arm 18 tends to move against the beam 48. The gage elements 51—51 and 52—52 may be arranged in a Wheatstone bridge arrangement, such as that shown in FIG. 4. Bridge excitation is supplied by a source 53 which may be AC or DC. The bridge output is detected and fed through a suitable amplifier 54 to a recording device 55, such as galvanometer, oscilloscope, oscillograph, or the like.

In operation, the input force P may be set by adjusting the spring 45. The force P may be calculated by measuring the force Q applied to arm 18 of shoe 11 using the equations previously discussed. (If desired, the calibrated scale 45A may be utilized to read the force P directly.) The motor control 32 is adjusted to supply torque T from motor 21 to shaft 26 and drum 16 until slippage between shoe 11 and drum 16 is impending. The reactive force Q may then be read from recording device 55. The value of $\mu_s$, the coefficient of static friction between drum 16 and shoe 11 may be calculated from the above-mentioned equations (1) to (3). The same operation applies to the measurement of $\mu_k$, the coefficient of kinetic friction when the control 32 is adjusted to provide for slippage between the clutch 11 and the drum 16 at a constant velocity.

The friction testing method and apparatus of the invention may be utilized in a friction testing device of general application to determine the coefficient of friction between any two materials. As one example, the method of the invention may be applied to two materials by forming a first material into the general shape of the clutch shoe 11 as shown in FIG. 1 and forming the second material into a curved surface similar to the drum 16 of FIG. 1.

Since it may not be practical in every instance to form a shoe from a material under test due to difficulty in fabricating, discrete test samples of one of the materials may be formed into a convenient shape, such as a cylinder and the other material formed with an arcuate surface, similar to the arcuate inner surface of the clutch driving drum.

In order to determine the characteristics of the coefficient of friction of these test samples, a universal fixture has been developed. FIG. 5 shows such a fixture which includes a universal sample holder 58 comprising a semicircular support member 59 having formed therein a pair of radially spaced arcuate slots 61 and 62 and a pair of angularly adjustable arms or chuck arms 63—63 for retaining cylindrical samples 64—64 of a first material.

As shown in FIGS. 5 and 6, each arm 63 is fastened to the support member 59 a pair of headed bolts 66—66 extending through the slots 61 and 62 secured by a pair of lock nuts 67—67. The outer extremity of each arm 63 has formed therein a cylindrical recess 68 for receiving a cylindrical sample 64. The recess 68 communicates with a pair of oppositely spaced tapped holes 69—69 (FIG. 7) for receiving a pair of setscrews 71—71 which may be adjusted to retain the sample 64 within the recess 68. As shown in FIG. 7, each sample 64 may be machined with chordal slots to provide flats 72—72 on opposite sides for engagement with the setscrews 71—71.

The holder 58 may be supported within a rotatable clutch drum 16' (FIG. 5) which may be formed of a second material or have a strip or coating of a second material on its inside periphery. The relative positions of a shaft 26', an input loading beam or lever 41' and an output strain gage beam 48' are shown as they appear in the apparatus of FIG. 3. The dimensions $r, x, l$, and the angles $\alpha, \beta,$ and $\phi$, as defined in the discussion accompanying FIG. 1 are shown in FIG. 5 as $r', x', l', \alpha', \beta',$ and $\phi'$, respectively. The support member 59 may be graduated in degrees so that the angular positions of holders 63—63 may be easily read. The dimensions $x'$ and $l'$ may be fixed or may be made adjustable by modifying the apparatus of FIG. 3 to make the radial positioning of the support bracket 42 and the beam support frame 51 adjustable with respect to the central axis of shaft 26.

In use of this fixture, the method of the invention, as previously discussed, may be used to obtain measured values of input and output forces to set up simultaneous equations which may be solved to provide indicators of the relationship between the measured output forces and the coefficients of friction at various applied torques. While a specific embodiment of a universal holder has been shown, any conveniently shaped holder having the dimensions of FIG. 1 present and ascertainable will suffice for carrying out the method of the invention.

While various specific embodiments and examples of methods and apparatus have been described in detail, it will be obvious that various modifications may be made from the specific details described without departing from the spirit and scope of the invention.

What is claimed is:

1. A method of obtaining the value of a force bearing a predetermined nonlinear relationship to the coefficient of friction between a clutch shoe and a drum of a metallic friction clutch, wherein the clutch shoe is disposed within the drum and has a pair of sides and a pair of spaced apart bearing surfaces disposed in engagement with the inner periphery of the drum, which comprises the steps of:

applying a predetermined force in a first reference direction to one side of the clutch shoe and effective through one of said bearing surfaces to further urge the clutch shoe into engagement with the drum;

applying a torque to the drum tending to rotate the drum with respect to the clutch shoe and generate friction forces between the clutch shoe and drum;

restraining said clutch shoe from movement by application of a reaction force at said other side and effective through the other of said bearing surfaces; and measuring the reaction force along a reference line parallel to said reference direction when the torque reaches a level at which the drum breaks away from said clutch shoe.

2. A method including the steps of claim 5 for determining the coefficient of friction between the clutch shoe and the drum, which comprises the additional steps of:

computing the coefficient of friction between the clutch shoe and drum by solving the simultaneous equations following:

a. $N_1(\cos \alpha + \mu \sin \alpha) - N_2(\cos \beta - \mu \sin \beta) = 0$,
b. $N_1(\sin \beta - \mu \cos \alpha) + N_2(\sin \beta + \mu \cos \beta) - Q - P = 0$, and
c. $\mu N_1 r + \mu N_2 r - Ql + Px = 0$, in which $\mu$ is the coefficient of friction between the clutch shoe and the drum, $P$ is the predetermined force, $N_1$ and $N_2$ are normal forces urging the bearing surfaces against the inner periphery of the drum, $Q$ is the reaction force at drum break away, $r$ is the radius of curvature of the inner periphery of the drum, $x$ and $l$ are radial distances in opposite directions from the center of curvature of the drum to the point where a diameter through the center of curvature perpendicularly intersects the lines of forces $P$ and $Q$, respectively, and $\alpha$ and $\beta$ are the angles between the diameter along which $x$ and $l$ may be measured and the radii to the point of application of said normal forces $N_1$ and $N_2$.

3. In a friction testing device, a rotatable member having an inside cylindrical surface of a first material, a holder including relatively angularly adjustable first and second arms for receiving specimen samples of second materials, said holder having input-force-receiving means and output-force-transmitting means, means for supporting said holder with said second materials engaging said first material within said rotatable member, means for applying a predetermined force to said input force receiving means at a position closer to said first arm than to said second arm, means for applying a torque to said rotatable member to produce an output force on said output-force-transmitting means, and means for measuring said output force at a position closer to said second arm than to said first arm.

4. In a friction testing device as defined in claim 3, the combination wherein said input force receiving means and said output force transmitting means lie in a common plane and are effective in directions which are parallel to each other.

5. In an apparatus for measuring the coefficient of friction between a pair of first members and a second member having an arcuate surface:

a support element having a pair of opposed sides and rotatably mounted about the center of curvature of the arcuate surface;

a pair of arms mounted adjustably on said support element for holding said first members in spaced engagement with the arcuate surface;

means for applying a first force to only one of said sides, said first force tending to rotate said support element and move said first members further into engagement with and relative to said arcuate surface in a predetermined direction;

means for applying a torque tending to rotate said second member in said predetermined direction relative to said first members; and means for restraining said support element from rotation by application of a reaction force at only the other of said sides; and means for determining the reaction force at said other side.

6. A combination as defined in claim 5 wherein the support element comprises:

a plate having arcuate slots; and characterized by fasteners passing through the arcuate slots for securing the arms at various radial positions about the center of curvature of the engaged arcuate surface.

7. A method of determining the coefficient of friction between a first member having a pair of spaced-apart curved engaging surfaces and a second member having an arcuate surface, and comprised of the steps of:

applying a predetermined force ($P$) to a predetermined point on the first member;

applying a torque tending to rotate one of said members relative to the other of said members;

applying a second force ($Q$) to a spaced second predetermined point on said first member, such that with said first force a pair of normal forces ($N_1$ and $N_2$) extending through said engaging surfaces are generated for urging said spaced-apart curved engaging surfaces against said arcuate surface;

measuring the second force at breakaway of said second member from said first member; and computing the coefficient of friction ($\mu$) between the members by solving the simultaneous equations of equalibrium comprising:

a. $N_1(\cos\alpha + \mu \sin\alpha) - N_2(\cos\beta - \mu \sin\beta) = 0$, b. $N_1(\sin\alpha - \mu\cos\beta) + N_2(\sin\beta + \mu\cos\beta) - Q - P = 0$, and c. $\mu N_1 r + \mu N_2 or - Ql + Px = 0$ in which $r$ is the radius of curvature of said arcuate surface, $x$ and $l$ are radial distances in opposite directions from the center of curvature of the arcuate surface to the point where a diameter through said center of curvature perpendicularly intersects the lines of forces $P$ and $Q$, respectively, and $\alpha$ and $\beta$ are the angles between the diameter along with $x$ and $l$ may be measured and the radii to the point of application of said normal forces $N_1$ and $N_2$.

* * * * *

PO-1050
(5/69)

UNITED STATES PATENT OFFICE
CERTIFICATE OF CORRECTION

Patent No. 3,640,118           Dated February 8, 1972

Inventor(s) DAVID G. GEIS

It is certified that error appears in the above-identified patent and that said Letters Patent are hereby corrected as shown below:

Column 3, line 66, before "simultaneous" insert --the--.

Column 6, line 23 (being line 1 of claim 2), change "5" to --1--.

Column 8, line 14 (being line 21 of claim 7), change "$\beta$", first occurrence, to --$\alpha$--.

Column 8, line 15, (being line 22 of claim 7), change "N₂or" to --$N_2r$--.

Column 8, line 22, (being line 29 of claim 7), change "with" to --which--.

All line references herein refer to lines of text and not line reference numerals.

Signed and sealed this 15th day of May 1973.

(SEAL)
Attest:

EDWARD M. FLETCHER, JR.
Attesting Officer

ROBERT GOTTSCHALK
Commissioner of Patents